US007191962B2

(12) United States Patent
Byron et al.

(10) Patent No.: US 7,191,962 B2
(45) Date of Patent: Mar. 20, 2007

(54) SPRAYER APPARATUS WITH BACKFLOW VALVE

(75) Inventors: David Byron, Honeoye Falls, NY (US); Ronald M. Odessa, Batavia, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 342 days.

(21) Appl. No.: 10/785,539

(22) Filed: Feb. 24, 2004

(65) Prior Publication Data

US 2004/0227013 A1 Nov. 18, 2004

Related U.S. Application Data

(63) Continuation-in-part of application No. 09/934,747, filed on Aug. 22, 2001, now Pat. No. 6,695,228.

(60) Provisional application No. 60/226,831, filed on Aug. 22, 2000.

(51) Int. Cl.

| | |
|---|---|
| ***B05B 7/26*** | (2006.01) |
| ***B05B 7/32*** | (2006.01) |
| ***B05B 1/30*** | (2006.01) |
| ***B05B 9/04*** | (2006.01) |
| ***E03C 1/10*** | (2006.01) |
| ***F16K 24/00*** | (2006.01) |

(52) U.S. Cl. ...................... 239/574; 239/569; 239/310; 239/337; 239/373; 137/218

(58) Field of Classification Search ................ 239/574, 239/569, 310, 337, 373, 570, 571, 576, 525, 239/526, 302, 333, 340, 350, 398, 407; 137/218, 137/217, 512, 854; 222/394–396

See application file for complete search history.

(56) References Cited

U.S. PATENT DOCUMENTS

| | | | |
|---|---|---|---|
| 194,597 | A | 8/1877 | Hearle |
| 1,078,028 | A | 11/1913 | Zeamans |
| 1,246,227 | A | 11/1917 | Bouvin |
| 1,299,567 | A | 4/1919 | Farr |
| 1,499,642 | A | 7/1924 | Craig |
| 1,616,775 | A | 2/1927 | Williams |
| 2,501,260 | A | 3/1950 | Brodin |
| 2,645,381 | A | 7/1953 | Lattman |
| 2,750,752 | A | 6/1956 | Yorgey, Jr. |

(Continued)

OTHER PUBLICATIONS

Robert H. Wilkenson and Julie Stachecki, Project Your Water Supply From Agricultural Chemical Backflow, Feb. 1993, 12 pages, http://www.ag.uiuc.edu/~vista/html_pubs/back/back.htm.

*Primary Examiner*—Kevin Shaver
*Assistant Examiner*—Darren Gorman
(74) *Attorney, Agent, or Firm*—Kenneth J. Lukacher

(57) ABSTRACT

The invention comprises, in one form thereof, a sprayer apparatus that includes a disengageable pressurized fluid source, a pressure chamber in fluid communication with the fluid source, a backflow valve, a sealed vessel, and a sprayer outlet. The backflow valve has two one-way valves separated by a weep mechanism and is positioned between the fluid source and the pressure chamber such that the two one-way valves allow fluid flow from the fluid source to the pressure chamber. The sealed vessel is in fluid communication with the pressure chamber. The sprayer outlet includes a shutoff valve in fluid communication with the pressure chamber. The shutoff valve normally prevents fluid flow from the pressure chamber to the sprayer outlet and is operable to allow fluid flow from the pressure tank to the sprayer outlet.

21 Claims, 5 Drawing Sheets

U.S. PATENT DOCUMENTS

| | | | | | |
|---|---|---|---|---|---|
| 2,813,402 | A | | 11/1957 | Piethig et al. | |
| 2,917,077 | A | | 12/1959 | Ziege | |
| 2,968,315 | A | | 1/1961 | Fisher | |
| 3,034,731 | A | * | 5/1962 | Chapin | 239/318 |
| 3,103,950 | A | | 9/1963 | Gulick | |
| 3,109,566 | A | | 11/1963 | Yetter | |
| 3,211,173 | A | | 10/1965 | Mueller et al. | |
| 3,245,583 | A | | 4/1966 | Miller et al. | |
| 3,718,165 | A | | 2/1973 | Grothoff | |
| 3,735,777 | A | | 5/1973 | Katzer et al. | |
| 3,749,141 | A | | 7/1973 | Garretson | |
| 3,756,513 | A | | 9/1973 | Denninger | |
| 3,782,640 | A | | 1/1974 | Kirschmann | |
| 3,790,039 | A | | 2/1974 | Zucconi | |
| 3,794,077 | A | | 2/1974 | Fanshier | |
| 3,918,481 | A | | 11/1975 | Doe et al. | |
| 3,993,245 | A | | 11/1976 | Smith | |
| 4,154,367 | A | | 5/1979 | Hanson et al. | |
| 4,180,189 | A | | 12/1979 | Zurit et al. | |
| 4,186,783 | A | | 2/1980 | Brandt | |
| 4,244,526 | A | | 1/1981 | Arth | |
| 4,319,604 | A | | 3/1982 | Bird | |
| 4,431,117 | A | | 2/1984 | Genbauffe et al. | |
| 4,436,111 | A | | 3/1984 | Gold et al. | |
| 4,682,625 | A | | 7/1987 | Christopher | |
| 4,782,982 | A | | 11/1988 | Ellison | |
| 4,930,664 | A | | 6/1990 | Ellison | |
| 4,930,686 | A | | 6/1990 | Ellison | |
| 5,094,261 | A | * | 3/1992 | Giacomini | 137/107 |
| 5,174,343 | A | | 12/1992 | Rood | |
| 5,228,471 | A | * | 7/1993 | Hoeptner, III | 137/218 |
| 5,373,975 | A | | 12/1994 | Husted | |
| 6,234,347 | B1 | | 5/2001 | Amron | |
| 6,394,148 | B1 | | 5/2002 | Clarke | |
| 6,896,203 | B1 | * | 5/2005 | Restive | 239/302 |
| 6,997,399 | B2 | * | 2/2006 | Lacy | 239/373 |

* cited by examiner

SPRAYER APPARATUS WITH BACKFLOW VALVE

CROSS-REFERENCE TO RELATED APPLICATIONS

This application is a Continuation-in-Part of U.S. patent application Ser. No. 09/934,747, filed Aug. 22, 2001, now U.S. Pat. No. 6,695,228, issued Feb. 24, 2004, which, in turn, claims the benefit of U.S. Provisional Patent Application Ser. No. 60/226,831, filed Aug. 22, 2000.

FIELD OF THE INVENTION

This invention relates to sprayers used in conjunction with a pressurized hose and a separate tank.

BACKGROUND OF THE INVENTION

Conventional self-pressurizing garden sprayers require that a pressurized fluid source such as a garden hose be continually connected to the sprayer to provide the spray pressure. Other sprayers may allow the hose to be disconnected after the sprayer is charged however, the hose must be connected to a pressure vessel that is on the ground or otherwise inconvenient to get to. What is needed in the art is a self-pressurizing sprayer with a more convenient method of charging the sprayer. Further, what is needed is a sprayer with an improved backflow valve.

U.S. Utility patent application Ser. No. 09/934,747, filed Aug. 22, 2001, now issued under U.S. Pat. No. 6,695,228 on Feb. 24, 2004 is hereby incorporated by reference.

SUMMARY OF THE INVENTION

The invention comprises, in one form thereof, an apparatus that operates to allow a spray of a liquid from a sealed holding tank to a sprayer handle. The spray fluid is then directed through a shutoff valve and out a sprayer nozzle. The sealed tank is charged by connecting a pressurized fluid source such as a garden hose to the sprayer handle. Examples of spray fluids are insecticides, herbicides, and fertilizers.

A novel backflow valve prevents the fluid in the sprayer from escaping through the fluid source fitting when the fluid source is not connected. Further, the backflow valve prevents the spray fluid from contaminating the fluid source. This is especially important if the spray fluid is a pesticide or similar substance and the fluid source is a garden hose connected to a residential water supply. The backflow valve includes two one-way valves and a weep mechanism that restricts backflow pressure. In one embodiment, the weep mechanism includes a port to relieve pressure in the backflow valve if it reaches sufficiently high levels.

BRIEF DESCRIPTION OF THE DRAWINGS

The above-mentioned and other features and advantages of this invention, and the manner of attaining them, will become apparent and be better understood by reference to the following description of the embodiments of the invention in conjunction with the accompanying drawings, wherein.

Corresponding reference characters indicate corresponding parts throughout the several views. The examples set out illustrate certain embodiments of the invention but do not delineate the scope of the invention.

DETAILED DESCRIPTION

Figure 1:
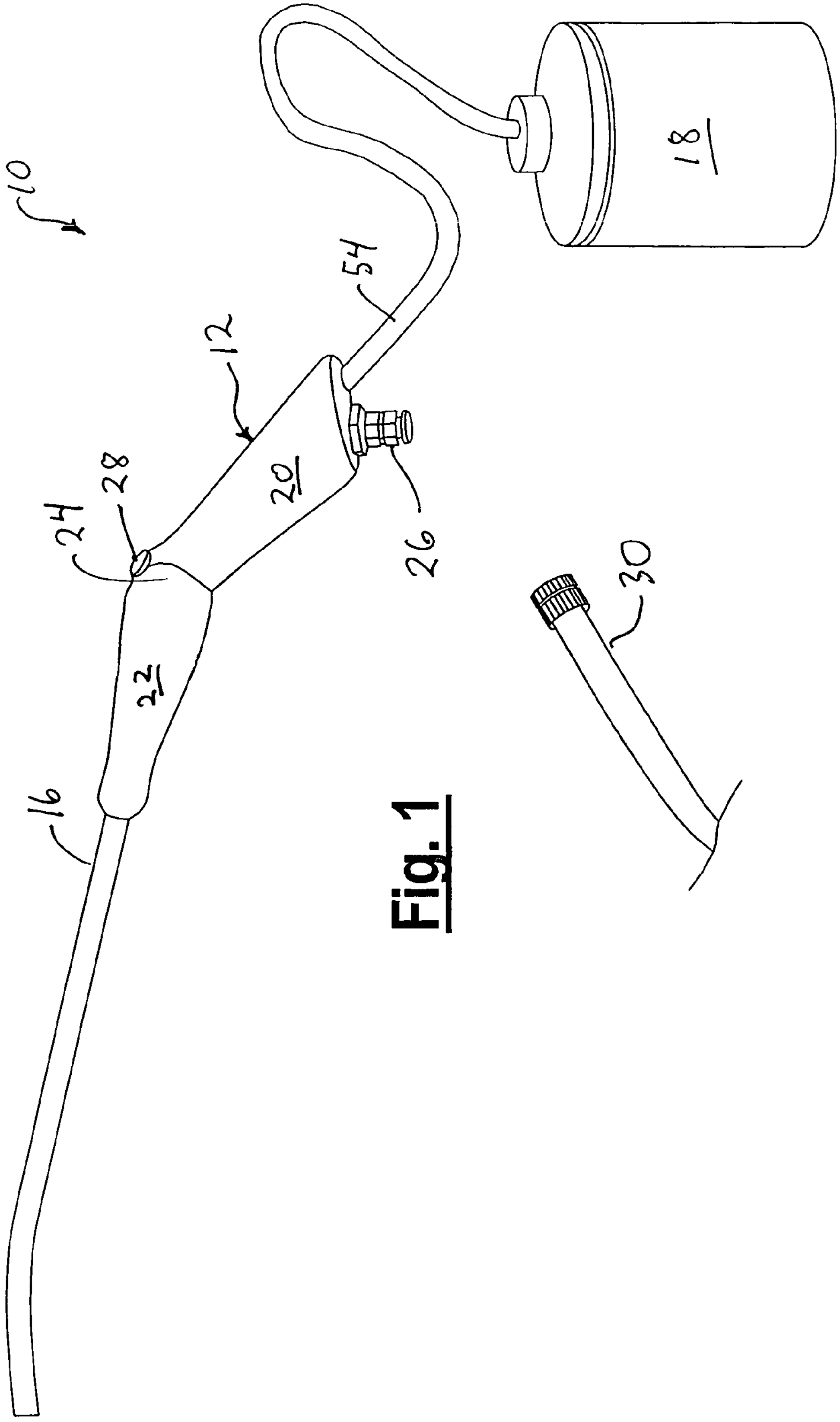
FIG. 1 is a side view of a the sprayer apparatus of the present invention.

FIG. 1 displays the sprayer apparatus of the present invention. The sprayer 10 includes a housing 12, a backflow valve 14 (FIG. 2), a discharge tube 16, and a sealed vessel 18.

The housing 12 includes a pressurization chamber 20, a discharge chamber 22, a shutoff valve 24, and a quick-disconnect receptacle 26. The shutoff valve 24 normally seals the pressurization chamber 20 off from the discharge chamber 22. The shutoff valve 24 includes a valve release 28. The valve is opened by depressing the valve release 28 to thereby place the pressurization chamber 20 in fluid communication with the discharge chamber 22. The quick-disconnect receptacle 26 is affixed to or integral with the pressurization chamber 20 and is configured to cooperate with a pressurized fluid source 30 having a quick disconnect attachment. The fluid source is preferably a hose such as a garden hose connected to a domestic water supply. The hose may alternatively be connected to a tank that is pressurized by a pump.

Figure 2:
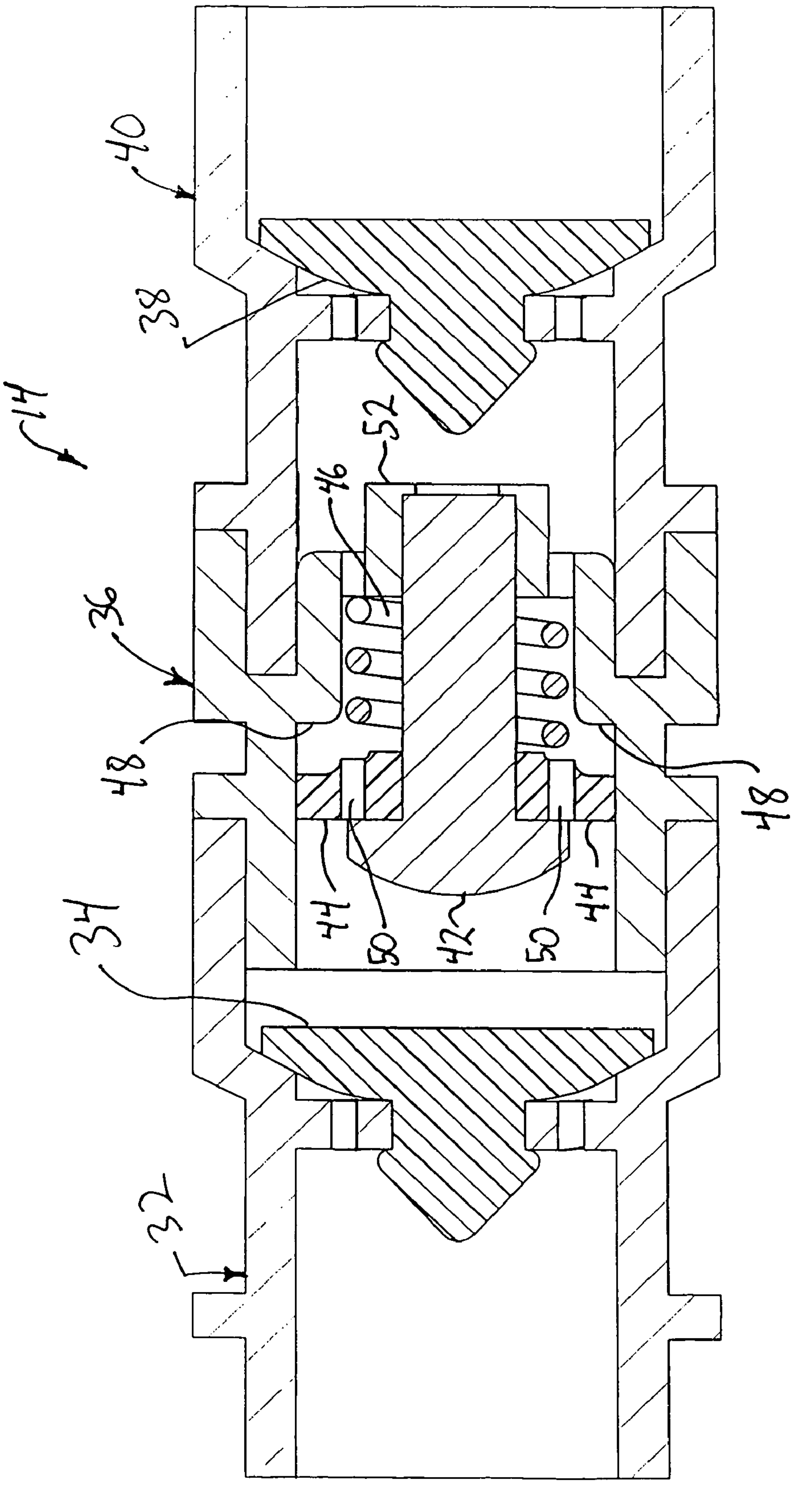
FIG. 2 is a cross-sectional view of the backflow valve of the first embodiment of the present invention.

The backflow valve 14 is situated between the fluid source 30 and the pressurization chamber 20 allowing fluid to flow to the pressurization chamber 20 from the fluid source 30 and preventing fluid flow in the reverse direction. The backflow valve 14 is best shown in FIG. 2. The backflow valve 14 includes a source-side chamber 32, a source-side stopper 34, a weep chamber 36, an outlet stopper 38, and an outlet chamber 40. The source-side stopper 34 is configured to prevent fluid flow from the weep chamber 36 to the source-side chamber 32 and allow fluid flow in the reverse direction. Similarly, the outlet stopper 38 is configured to prevent fluid flow from the outlet chamber 40 to the weep chamber 36 and allow fluid flow in the reverse direction. The weep chamber 36 encloses a button head screw 42, a weep plunger 44, and a spring 46. The weep plunger 44 is normally biased against the head of the button head screw 42 by the spring 46, however higher pressure on the source side of the weep chamber 36 forces the weep plunger 44 to travel along the button head screw 42 until a shoulder 48 prevents the weep plunger 44 from traveling further toward the outlet side of the weep chamber 36. The button head screw 42 therefore acts as a plunger guide. The weep plunger 44 has a plurality of through holes 50 that are configured such that the head of the button head screw 42 covers the majority of each through hole when the weep plunger 44 engages the head of the button head screw 42. The button head screw 42 is retained within the weep chamber 36 by a partition 52, which is perforated to allow fluid flow within the weep chamber 36.

The discharge tube 16 is in fluid communication with the discharge chamber 22. An elongated discharge tube 16 is shown in FIG. 1, however tubes and nozzles of many different shapes and configurations can be imagined.

The sealed vessel 18 is connected to the pressurization chamber 20 by a flexible tube 54. The sealed vessel 18 contains a fluid that is to be sprayed by the sprayer 10.

Examples of fluids that may be used are fertilizers, insecticides, herbicides, etc. The sealed vessel 18 is sealed such that the only fluid communication into and out of the sealed vessel 18 is through the flexible tube 54.

Figure 3:
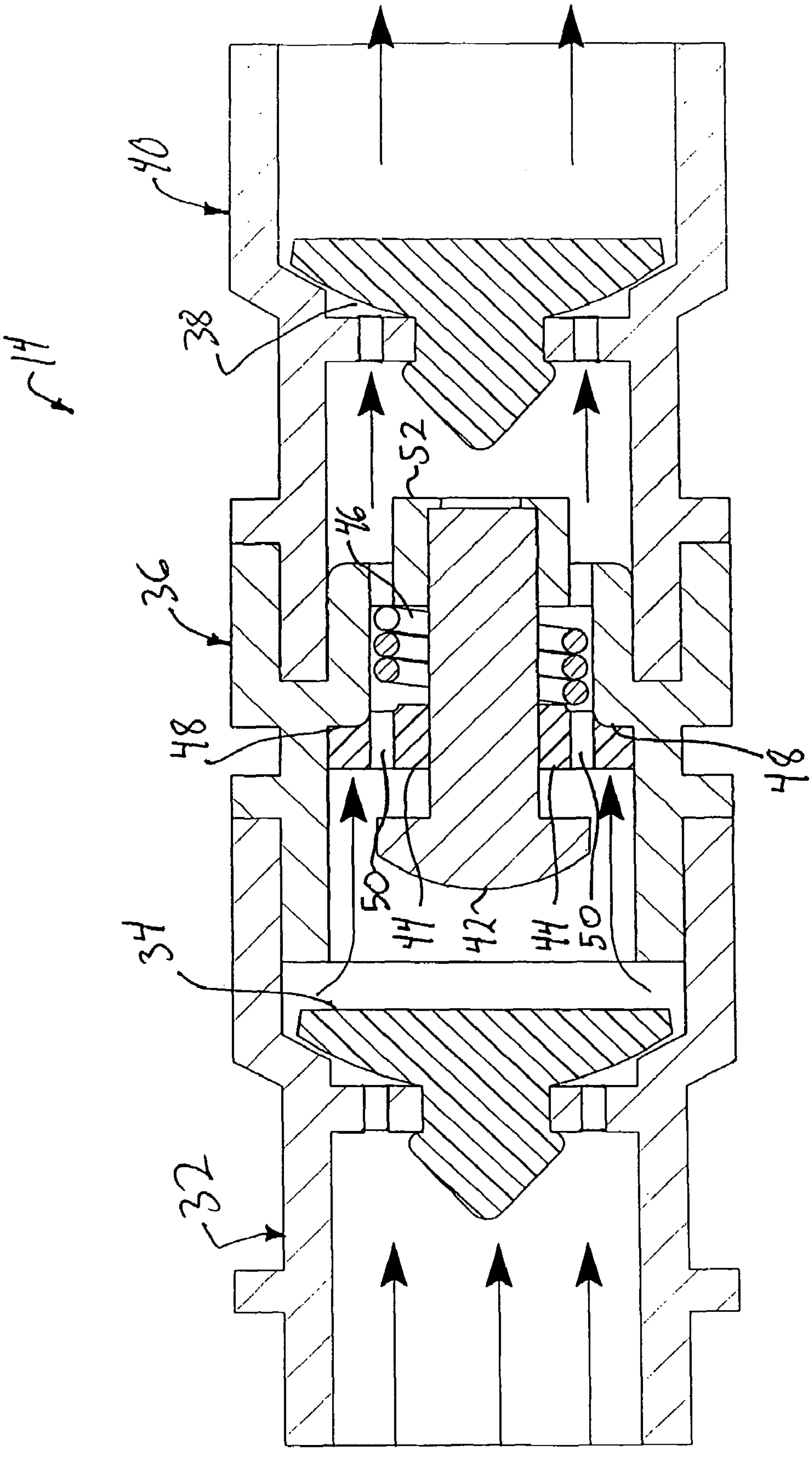
FIG. 3 is a second cross-sectional view of the backflow valve of FIG. 2.

In use, an amount of the spray fluid that is to be sprayed by the sprayer 10 is placed into the sealed vessel 18, which is then connected to the pressurization chamber 20 by the flexible tube 54 and is otherwise sealed shut. The pressurized fluid source 30 is connected to the quick-disconnect receptacle 26. The pressurized fluid flows through the backflow valve 14 into the pressurization chamber 20 and through the flexible tube 54 to the sealed vessel 18. The backflow valve is shown during charging of the sprayer 10 in FIG. 3. The fluid flows past source-side stopper 34 and applies pressure to the weep plunger 44, which travels along the button head screw 42 against the spring 46 to seat against the shoulder 48. Thus the through holes 50 are fully open to allow increased fluid flow within the weep chamber 36. The fluid then flows past outlet stopper 38 and into pressurization chamber 20. Since there is no outlet for the fluids within the sprayer 10, there is a buildup of pressure within the pressurization chamber 20 and the sealed vessel 18. As the pressure in the sprayer 10 equalizes with the pressurized fluid source, the fluid flow within the backflow valve 14 decreases and the spring 46 forces the weep plunger 44 against the head of the button head screw 42 as shown in FIG. 2. Further, the outlet stopper 38 and the source-side stopper 34 close. The fluid source 30 may be removed from the quick-disconnect receptacle 26 once the sealed vessel 18 is pressurized. The valve release 28 is then depressed to open the shutoff valve 24 and discharge the fluid in the pressurization chamber 20 and the sealed vessel 18 through the discharge chamber 22 and the discharge tube 16. When the sprayer 10 needs to be recharged, the user releases the valve release 28 to close the shutoff valve 24. The sprayer 10 is then pressurized again and the process is repeated until the spray fluid in the sealed vessel 18 is gone.

The sprayer 10 can alternatively be configured so that the fluid source 30 remains engaged with the quick-disconnect receptacle 26 during the spraying process. In this alternative, the fluid source 30 pressurizes the pressurization chamber 20 and the sealed vessel 18 as the user opens and closes the shutoff valve 24. Thus the sprayer 10 remains pressurized and the sprayer can be used until the spray fluid is gone.

In the case that there is a sudden drop in pressure in the fluid source 30, the backflow of fluid in the pressurized chamber 20 and thus outlet chamber 40 could possibly be so rapid that some of the spray fluid that entered the pressurized chamber 20 from the sealed vessel 18 enters the weep chamber 36 before the backpressure forces the outlet stopper 38 to close. The pressure drop in weep chamber 36 allows the spring 46 to force the weep plunger 44 against the button head screw 42 thus limiting fluid flow within the weep chamber 36. The source-side stopper 34 closes before any spray fluid may pass into the source-side chamber 32. Thus, the backflow valve 14 is configured such that even if some spray fluid enters the weep chamber 36, the spray fluid is prevented from contaminating the fluid source 30.

Figure 4:
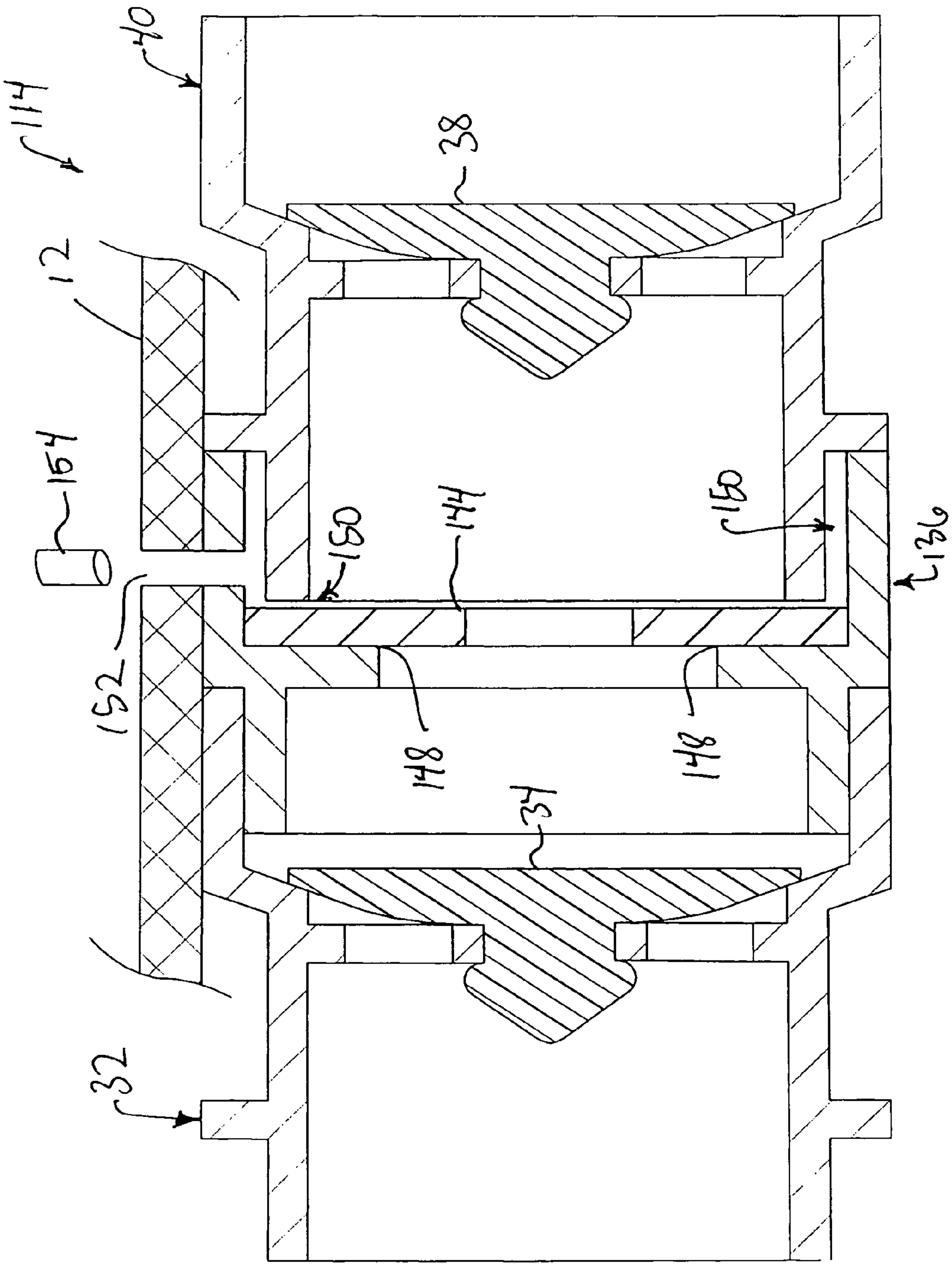
FIG. 4 is a cross-sectional view of the backflow valve of the second embodiment of the present invention.

In a second embodiment, the backflow valve 14 is replaced by backflow valve 114 shown in FIG. 4. The same reference numbers are used to indicate features in the backflow valve 114 that are similar or substantially identical to those in the backflow valve 14.

Similarly to the backflow valve 14, the backflow valve 114 is situated between the fluid source 30 and the pressurization chamber 20 allowing fluid to flow to the pressurization chamber 20 from the fluid source 30 and preventing fluid flow in the reverse direction. The backflow valve 114 includes a source-side chamber 32, a source-side stopper 34, a weep chamber 136, an outlet stopper 38, and an outlet chamber 40. The weep chamber 136 encloses a weep diaphragm 144, a shoulder 148, and a weep slot 150. The weep diaphragm 144 includes a through hole to allow fluid to flow within weep chamber 136. The weep slot 150 is on the outlet side of the weep diaphragm 144 and is in fluid communication with a channel 152 in the housing 12. A push-in stopper 154 normally seals the channel 152 to prevent fluid in the weep slot 150 from leaking. A significant pressure within the weep chamber 136 and thus the weep slot 150 may eject the push-in stopper 154 from the channel 152. The push-in stopper 154 may be attached to the housing 12 or the backflow valve 114 to prevent it from being lost if it is ejected from the channel 152.

Figure 5:
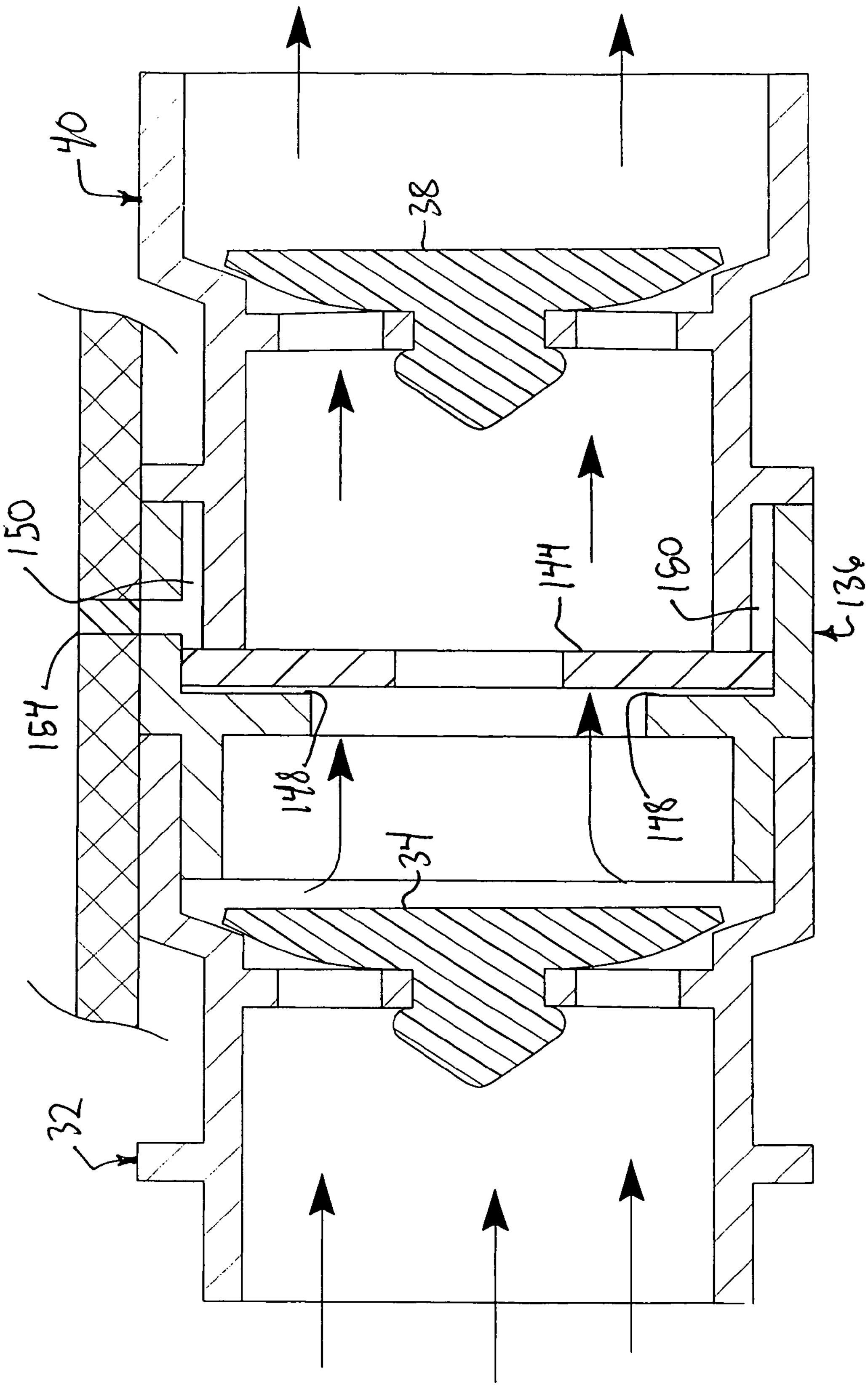
FIG. 5 is a second cross-sectional view of the backflow valve of FIG. 4.

In use, the fluid flow through the backflow valve 114 from the fluid source 30 is shown in FIG. 5. The fluid from the fluid source 30 flows past the source-side stopper 34 into the weep chamber 136. The fluid pressure on the source side of the weep diaphragm 144 forces the weep diaphragm off shoulder 148 thus closing off the weep slot 150 to prevent the push-in stopper from being ejected while the sprayer 10 is being charged. The fluid flows through the through hole in the weep diaphragm 144 and past the outlet stopper 38 into the pressurization chamber 20. When the pressure in the pressurization chamber 20 has equalized with the pressure in the fluid source 30, the outlet stopper 38 and the source-side stopper 34 close the respective outlet chamber 40 and the source-side chamber 32. Thus fluid flow from the outlet side to the source side of the backflow valve 114 is prevented and the fluid source 30 may be disconnected.

In the case that there is a sudden drop in pressure in the fluid source 30, the backflow of fluid in the pressurized chamber 20 and thus outlet chamber 40 could possibly be so rapid that some of the spray fluid that entered the pressurized chamber 20 from the sealed vessel 18 enters the weep chamber 136 before the backpressure forces the outlet stopper 38 to close. The pressure drop in weep chamber 136 forces the weep diaphragm 144 against the shoulder 148 thereby opening the weep slot 150. Further, the shoulder 148 restricts the amount the weep diaphragm 144 may flex toward the source side of the weep chamber 136 thus restricting the fluid flow towards the source-side stopper 34 and providing time for the source-side stopper 34 to close. The pressure within the weep chamber 136 is communicated to the now open weep slot 150 and if a sufficient pressure is reached, the push-in stopper 154 is ejected. Therefore the pressure within the weep chamber 136 is relieved before a pressure that could cause a failure in the source-side stopper 34 is reached. Thus, the backflow valve 114 is configured such that even if some spray fluid enters the weep chamber 136, the spray fluid is prevented from contaminating the fluid source 30.

It should be noted that the quick-disconnect receptacle 26 may be replaced by another type of receptacle such as an externally threaded receptacle configured for cooperating with a standard garden hose. Further, each of the backflow valves 14 and 114 are shown with a 3 piece chamber wall construction, however embodiments having fewer pieces or more pieces may be imagined. Even further, the first embodiment of the backflow valve may include a weep slot and push-in stopper similar to that used in the second embodiment in order to provide an outlet for the fluid in the weep chamber if the pressure reaches significant levels.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A sprayer apparatus, comprising:

a pressure chamber having an inlet and an outlet;

a backflow valve having two one-way valves separated by a weep chamber, said backflow valve being positioned in fluid communication with the inlet of said pressure chamber such that the two one-way valves allow fluid flow from said inlet into said pressure chamber and prevent fluid flow from said pressure chamber in a reverse direction through the inlet;

a sealed vessel in fluid communication with said pressure chamber; and a shutoff valve in fluid communication with the outlet of said pressure chamber, the shutoff valve normally preventing fluid flow from said pressure chamber through the outlet and being operable to allow fluid flow from said pressure chamber through the outlet.

2. The sprayer apparatus of claim 1, further comprising a pressurized fluid source in fluid communication with the inlet of said pressure chamber.

3. The sprayer apparatus of claim 2, wherein said pressurized fluid source is connected to the inlet of said pressure chamber by a quick-disconnect coupling.

4. The sprayer apparatus of claim 1, wherein the weep chamber of said backflow valve includes a weep plunger that reduces backflow pressure within the weep chamber.

5. The sprayer apparatus of claim 4, wherein said weep plunger defines a plurality of apertures and said weep chamber further comprises a biasing spring and a plunger guide having a head, wherein said spring biases said weep plunger against the head of said plunger guide and the head of said plunger guide partially covers the apertures defined by the weep plunger.

6. The sprayer apparatus of claim 4, wherein the weep chamber of said backflow valve further includes a weep outlet having a seal tube configured to be ejected from the weep outlet when under a pre-determined backflow pressure in the weep chamber.

7. The sprayer apparatus of claim 1 wherein said pressure chamber is configured as a sprayer wand.

8. The sprayer apparatus of claim 1 further comprising:

a sprayer handle having an outlet in communication with said pressure chamber;

a water source in fluid communication with said sprayer handle via said inlet of said pressure chamber;

said sealed vessel being in fluid communication with said sprayer handle; and said backflow valve being positioned between said water source and said pressure chamber such that said backflow valve prevents fluid flow from said sprayer handle to said water source.

9. The sprayer apparatus of claim 8 wherein the weep chamber includes a weep plunger that reduces backflow pressure within the weep chamber.

10. The sprayer apparatus of claim 9, wherein said weep plunger defines a plurality of apertures and said weep chamber further comprises a biasing spring and a plunger guide having a head, wherein said spring biases and weep plunger against the head of said plunger guide and the head of said plunger guide partially covers the apertures defined by the weep plunger.

11. The sprayer apparatus of claim 8 wherein the weep chamber includes a weep diaphragm that reduces backflow pressure within the weep chamber.

12. The sprayer apparatus of claim 11, wherein the weep chamber further includes a weep outlet having a seal tube configured to be ejected from the weep outlet when under a pre-determined backflow pressure in the weep chamber.

13. The sprayer apparatus of claim 12, wherein the weep diaphragm defines an aperture and said weep chamber further comprises a shoulder such that the shoulder restricts the amount that the weep diaphragm may flex when under backflow pressure.

14. The sprayer apparatus of claim 8, wherein said source is pressurized and is connected to said sprayer handle by a quick-disconnect coupling.

15. The sprayer apparatus according to claim 1 connectable to an externally pressurized water source, and further comprising:

means for supplying a pressurized water stream to provide said pressurized water source; wherein said sealed vessel contains a liquid additive, and wherein said backflow valve is configured to prevent the liquid additive from flowing into said means for supplying a pressurized water stream.

16. The sprayer apparatus of claim 15, wherein the weep chamber includes a weep plunger that reduces backflow pressure within the weep chamber.

17. A sprayer apparatus, comprising:

a pressure chamber having an inlet and an outlet;

a backflow valve having two one-way valves separated by a weep chamber, said backflow valve being positioned in fluid communication with the inlet of said pressure chamber such that the two one-way valves allow fluid flow from said inlet into said pressure chamber and prevent fluid flow from said pressure chamber in a reverse direction through the inlet; and a sealed vessel in fluid communication with said pressure chamber via said outlet, wherein the weep chamber of said backflow valve includes a weep diaphragm that reduces backflow pressure within the weep chamber.

18. The sprayer apparatus of claim 17, wherein the weep chamber of said backflow valve further includes a weep outlet having a seal tube configured to be ejected from the weep outlet when under a pre-determined backflow pressure in the weep chamber.

19. The sprayer apparatus of claim 18, wherein the weep diaphragm defines an aperture and said weep chamber further comprises a shoulder such that the shoulder restricts the amount that the weep diaphragm may flex when under backflow pressure.

20. A sprayer apparatus, comprising:

a pressure chamber having an inlet and an outlet;

a backflow valve having two one-way valves separated by a weep chamber, said backflow valve being positioned in fluid communication with the inlet of said pressure chamber such that the two one-way valves allow fluid flow from said inlet into said pressure chamber and prevent fluid flow from said pressure chamber in a reverse direction through the inlet; and a sealed vessel containing a spray fluid in fluid communication with said pressure chamber via said outlet, and wherein said sprayer apparatus is connectable to an externally pressurized water source, and further comprising:

means for supplying a pressurized water stream to provide said pressurized water source; and said backflow valve being configured to prevent the spray fluid from flowing into said means for supplying said pressurized water stream, and wherein the weep chamber comprises a weep diaphragm that reduces backflow pressure within the weep chamber.

21. The sprayer apparatus of claim 20, wherein the weep chamber further includes a weep outlet having a plastic seal tube configured to be ejected from the weep outlet when under a pre-determined backflow pressure in the weep chamber.

* * * * *